United States Patent
Vogel

(10) Patent No.: US 6,742,187 B1
(45) Date of Patent: May 25, 2004

(54) UPSTREAM BANDWIDTH ALLOCATION MAP (MAP)-INITIATED CHANNEL CHANGE METHOD FOR DATA-OVER-CABLE SYSTEMS

(75) Inventor: Mark O. Vogel, Hampshire, IL (US)

(73) Assignee: 3Com Corporation, Marlborough, MA (US)

( * ) Notice: Subject to any disclaimer, the term of this patent is extended or adjusted under 35 U.S.C. 154(b) by 720 days.

(21) Appl. No.: 09/663,756

(22) Filed: Sep. 15, 2000

(51) Int. Cl.$^7$ ................................................. H04N 7/18
(52) U.S. Cl. ........................ 725/126; 725/111; 725/118; 370/341; 370/431; 370/485
(58) Field of Search .......................... 725/126, 95, 111, 725/118, 121, 131, 105; 370/341, 468, 485, 486, 487, 480, 484, 431, 443, 225, 228

(56) References Cited

U.S. PATENT DOCUMENTS

| 5,787,483 A | 7/1998 | Jam et al. ................... 711/158 |
| 5,883,901 A | 3/1999 | Chiu et al. ................... 370/508 |
| 5,963,557 A | 10/1999 | Eng ............................. 370/432 |
| 6,170,061 B1 | 1/2001 | Beser .......................... 713/201 |
| 6,230,326 B1 * | 5/2001 | Unger et al. ................. 725/111 |
| 2001/0010096 A1 * | 7/2001 | Horton et al. .............. 725/111 |

OTHER PUBLICATIONS

Data–Over–Cable Service Interface Specifications (DOCSIS) Radio Frequency Interface Specifications, Interim Draft, dated Jul. 24, 1998, Cable Television Laboratories, Inc.

* cited by examiner

Primary Examiner—Vivek Srivastava
Assistant Examiner—Ngoc Vu
(74) Attorney, Agent, or Firm—McDonnell Boehnen Hulbert & Berghoff

(57) ABSTRACT

An upstream channel change for a cable modem in a data-over-cable system is achieved via an upstream bandwith allocation map message sent from a cable modem termination system to cable modems, instead of requiring an exchange of upstream channel change request and reply messages. The result is that the upstream channel change can be made essentially immediately, in a deterministic fashion. As such, the upstream channel change method is particularly useful for time-sensitive applications, such as Internet telephony, VoIP, and Internet video on demand services. Load balancing can also be achieved more efficiently.

9 Claims, 7 Drawing Sheets

FIG. 5

MAP INFORMATION ELEMENTS — 100

| | SID | IUC | OFFSET |
|---|---|---|---|
| FIRST INTERVAL | SID 76 | IUC 102 | OFFSET 104 |
| SECOND INTERVAL | SID | IUC | OFFSET |
| ⋮ | | | |
| LAST INTERVAL | SID | IUC | OFFSET |

UPSTREAM BANDWIDTH ALLOCATION MAP (MAP)-INITIATED CHANNEL CHANGE METHOD FOR DATA-OVER-CABLE SYSTEMS

BACKGROUND OF THE INVENTION

A. Field of the Invention

This invention relates to the field of data communication and data-over-cable systems. More particularly, the invention relates to a method of changing the channel at which a cable modem transmits in the upstream direction to a cable modem termination system.

B. Description of Related Art

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, local area networks ("LANs"), and other computer networks via cable television networks. These cable modems currently support a data connection to the Internet and other computer networks via a cable television network with a data rate of up to 30+ Mbps, which is a much larger data rate than can be supported by a modem used over a standard telephone line. Background information related to cable modem systems in general is described in the Data-Over-Cable Service Interface Specifications ("DOCSIS")— Radio Frequency Interface Specifications, Interim Draft, dated Nov. 5, 1999, issued by Cable Television Laboratories, Inc. This document, known to persons working in the art, is incorporated by reference herein in its entirety.

Data-over-cable systems may serve many cable modems simultaneously. A cable modem receives and transmits data in the form of digitally encoded radio frequency transmissions, which typically travel to and from the cable modem on, for example, coaxial cable. Also, the data-over-cable system consists of many branches from a common trunk, each branch serving a distinct group of cable modems, and the branches themselves may further divide into sub-branches. Thus the propagation of radio frequency signals to and from the cable modem often follows a circuitous and convoluted path. Transmissions from the cable modem are terminated in a cable system head-end by a device known as a Cable Modem Termination System or CMTS.

Sometimes, one or more cable modems develops a fault. Because return signals from the cable modems arrive from their respective branches, it is often difficult to isolate faults in the network by examining combined return signals on the common trunk. Moreover, a fault in the coaxial cable serving a branch of the network may impair the signals for all the cable modems served by that branch. Thus a faulty cable modem's signals, or signals from a faulty branch of the network, may corrupt the signals of other cable modems on the common trunk. Such corruption frequently defeats attempts to distinguish and identify which cable modems or branches require repair.

Information concerning the location and nature of an impairment may be very useful to a cable service provider. Such information would allow the provider to map cable modems to faults in the data-over-cable network, thus enhancing the cable service provider's ability to diagnose and isolate problems in the data-over-cable network, and thereby reducing repair times and maintenance costs. A radio-frequency performance monitor is described in the patent application of Mark O. Vogel, entitled "Radio Frequency Performance Monitor for a Data-Over-Cable System" filed Aug. 9, 2000, Serial No. 09/634,780, the contents of which are incorporated by reference herein.

When impairments in the upstream channel from the cable modem to a CMTS exist, cable modem systems provide for the ability to change the upstream channel that the cable modem transmits in, that is, in the direction between the cable modem and the CMTS. In the prior art, the only way to move a registered modem from its current upstream channel to a new upstream channel is for the CMTS to issue an Upstream Channel Change request (UCC-REQ) message. When a modem receives this message, it must first issue an Upstream Channel Change Response message (UCC-RSP) on its current channel, and then it can move to the new channel as directed. However, to send a UCC-RSP message, a modem must actually first request an upstream opportunity for transmission of the UCC-RSP. To make the bandwidth request, a modem must wait for an Upstream Bandwidth Allocation Map message (MAP) with a Request (REQ) interval. During that interval, a modem can request the amount of bandwidth it needs to send its UCC-RSP message. Assuming that it does receive a REQ opportunity, and that the message is successfully received by the CMTS, the modem again must wait for the MAP that provides it with a grant for its requested upstream bandwidth. Upon receipt of this, the modem can then send its UCC-RSP message at the appropriate time defined by the MAP, and change the upstream channel.

A problem can occur with this prior art sequence. In particular, since the REQ interval is a contention interval, other modems may be competing for the same REQ opportunity. If another modem happens to make a request in the same interval, there will be a data collision and the CMTS will ignore the corrupted transmission. In this case, the modem will initiate its back off algorithm and attempt another bandwidth request transmission after waiting the number of REQ intervals specified by the algorithm. If the network is busy, this collision and back off process can occur multiple times, which can lead to a significant delay from a time a UCC-REQ is issued to the time the modem is actually able to move to the specified channel. In fact, after 2 seconds the CMTS will issue another UCC-REQ message to the modem.

Because the time associated with the UCC message exchange is not deterministic, that is, it cannot be known in advance, this method of operation is inadequate for voice applications, such as Voice over Internet Protocol (VoIP) applications, Internet telephony, Internet video on demand, or other time critical services, where service can be lost by such delays or degraded low service quality objectives. In addition, because of the potentially long time associated with the UCC message exchange, dynamic load balancing becomes inefficient. To avoid these problems, a new way of initiating a channel change is needed in the art which is (1) more deterministic, (2) which requires much less time to complete than the standard UCC message exchange, and (3) that allows dynamic load balancing to be efficiently achieved.

Whereas the prior art has failed to adequately address the upstream channel change problems in data-over-cable systems, the present invention provides an upstream channel change mechanism which is deterministic, can be completed in a sufficiently short period of time such that time critical services can be provided, and dynamic load balancing objectives can be efficiently reached.

SUMMARY OF THE INVENTION

A method of changing an upstream channel for a modem in a data-over-cable system is provided. The system includes a cable modem termination system (or the equivalent) that generates upstream bandwidth allocation map (MAP) messages for cable modems in the system. In accordance with the method, the cable modems monitor the MAP messages associated with an alternate upstream channel in the data-over-cable system for an indication that the cable modem may change the channel it currently transmitting in the upstream direction to a new channel. In response to the monitoring, the modem moves from its current channel to the new channel. Accordingly, since the method does not require exchange of upstream channel change request messages and associated reply messages, and the concomitant delays, the change in upstream channel may be achieved in an efficient manner without substantial delay. Furthermore, the dynamic load balancing in the upstream direction can be achieved efficiently.

In the illustrated embodiment, the cable modem monitors MAP messages associated with its current channel and MAP messages associated with other channels in the data-over-cable system that are viable alternate channels to the current channel. Basically, the cable modem is looking for an indication in a MAP message in the alternate channel, in which the indication comprises a unicast upstream transmission opportunity for the modem. The cable modem moves from the current channel to the new channel upon receipt of a MAP message in the alternate channel containing the upstream transmission opportunity. Several types of unicast upstream transmission opportunities are described.

In another aspect of the invention, a cable modem is provided which implements the method as described above, namely the monitoring of MAP messages and responsively changing its upstream channel.

In still another aspect, an improvement to a data-over-cable system is provided. The improvement comprises a cable modem termination system that transmits upstream bandwidth allocation map (MAP) messages for monitoring by cable modems in a data over cable system. The MAP messages contain fields with data instructing cable modems to change the upstream channel the cable modems use for transmitting data to the cable modem termination system. An upstream channel change is effected by the cable modems monitoring the MAP messages. The invention does not require an Upstream Channel Change Request message to be sent from said cable modem termination system to the cable modem, or a reply to such as request message, thereby overcoming the problems associated with prior art methods for changing upstream channels in such data-over-cable systems.

BRIEF DESCRIPTION OF THE DRAWINGS

The following detailed description makes reference to the appended drawings, in which:

FIG. 5 is a block diagram illustrating the structure of MAP Information Elements that may appear in the MAP message of FIG. 4;

DETAILED DESCRIPTION OF THE PREFERRED EMBODIMENT OF THE INVENTION

Before describing the inventive upstream channel change invention in detail, a review of a data-over-cable systems will be set forth initially for ease of understanding the invention, and for purposes of describing the best mode known for practicing the invention.

The Internet, a world wide network of interconnected computers, provides multi-media content including audio, video, graphics, and text that customers may best experience over data connections to the Internet that have large bandwidths, i.e., fast rates of data transmission. However, most Internet Service Providers ("ISPs") typically allow customers to connect to the Internet via a serial telephone line from a public switched telephone network at data rates including 14,400 bps, 28,800 bps, 33,600 bps, 56,000 bps, and others, which many customers find to be too slow. Therefore, customers are increasingly turning to other ways of connecting to the Internet that may provide data rates well in excess of those provided by telephone lines.

One high bandwidth data connection is available from a cable television network. The cable television network can provide data services having data rates from about 10 Mega-bits-per-second ("Mbps") to 30+ Mbps per channel. Apart from having the advantage of already being installed in most metropolitan areas, the cable television network also serves a large number of subscribers over a large geographical area through a network of coaxial cables or Hybrid FiberCoaxial ("HFC") cables. Cable television networks include those provided by Comcast Cable Communications, Inc., of Philadelphia, Pa., Cox Communications of Atlanta, Ga., Tele-Communications, Inc., of Englewood, Colo., Time-Warner Cable, of Marietta, Ga., Continental Cablevision, Inc., of Boston, Mass., among others. Data-over-cable systems, also known to those skilled in the art as cable modem systems, typically use the cable television network already in existence in the geographical area.

Figure 1:
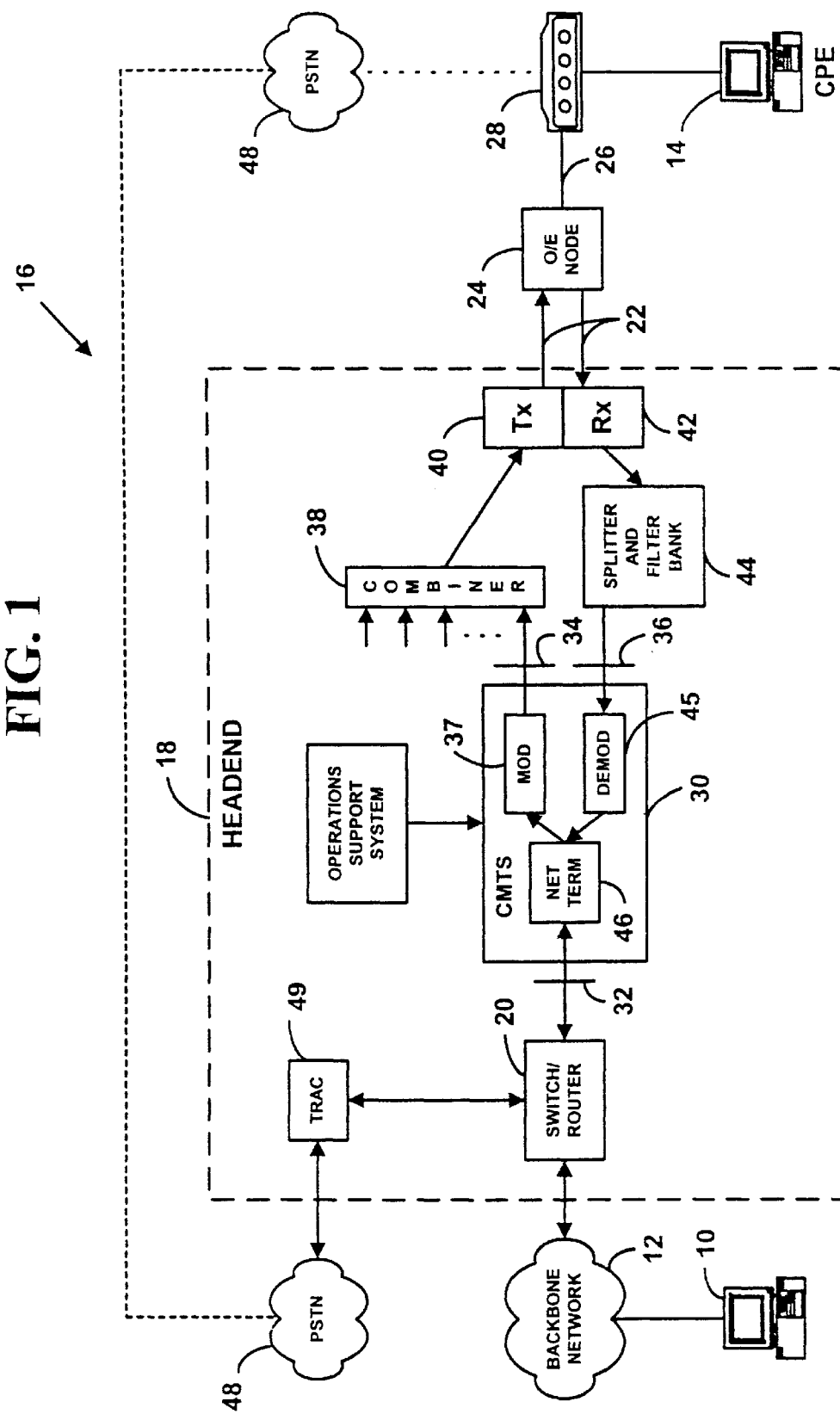
FIG. 1 is a block diagram illustrating a basic architecture for a data-over-cable system.

FIG. 1 is a block diagram illustrating the basic overall architecture of a data-over-cable system. The system of FIG. 1 provides a mechanism by which a computer 10 connected to a backbone network 12, either directly or indirectly by intermediate networks, may communicate with another computer 14 via a data-over-cable infrastructure indicated generally by reference numeral 16. The cable television infrastructure 16 includes a distribution hub or "head-end" 18 that is connected to the backbone network 12 via a switch or router 20. The cable system head-end 18 is typically a central location in the cable television network that is responsible for sending cable signals in the downstream direction as defined below. The head-end 18 modulates digital data from the backbone network 12 into analog form and supplies the analog signals to a fiber network 22, which is connected to a plurality of optical/electronic ("O/E") nodes 24. The O/E nodes 24 convert optical signals in the fiber network 22 to electrical signals for transmission over a coax cable network 26 to a cable modem 28 at the customer's location. The cable modem ("CM") 28 demodulates the analog signals, extracts the digital data, and supplies the data to the customer premise equipment ("CPE") 14. The CPE 14, in a typical situation, is a general purpose computer in a home environment but may alternatively be a multimedia display device or a point-of-sale terminal in a store.

The head-end 18 includes a cable modem termination system ("CMTS") 30. This device provides a network side interface to a wide area network, indicated at 32, and a radio frequency ("RF") interface between the CMTS 30 and the cable network in both the downstream and upstream directions, indicated respectively at 34 and 36. As used in the present document, the term "downstream" refers to transmission in the direction from the head-end 18 or CMTS 30 to the cable modem 28 at the customer premises. The term "upstream" refers to transmission in the direction from the cable modem 28 to the CMTS 30.

For transmission in the downstream direction, the CMTS 30 supplies data received from the computer 10 through the network 12 to a modulation circuit ("MOD") 37 and then to a combiner 38, which combines the data with video signals for the cable television system. The combined signals are sent to a transmission module 40 where they are imparted onto the fiber network 22.

In a typical two-way cable system, also termed a bi-directional cable system, a cable modem 28 will transmit data packets to the CMTS 30 over one or more upstream channels on the cable television network 22 and 26. In the upstream direction, the cable modem 28 transmits data from the CPE 14 over the cable network 26 and 22, which is received at a receiver module 42. The receiver module 42 couples the upstream signal to a splitter and filter bank 44 which separates the data signal from video signals for the cable television system and couples the data signal to a demodulation circuit ("DEMOD") 45 as in the CMTS 30. A network termination unit 46 processes the data, sends the data to the switch or router 20, and routes the data onto the network 12 for transmission to the remote computer 10.

A data packet may carry, as its payload, information that is sent from the CPE 14 and destined for the CMTS 30. The cable modem 28 adds overhead to the data packet to maintain the integrity of the payload. Examples of overhead include redundant bits for error correction and preambles. On the cable network 22 and 26 side of the cable modem 28, the cable modem 28 transmits from and receives the data packet and overhead in the form of digitally modulated radio frequency carriers. An exemplary bi-directional data-over-cable system includes customer premises equipment 14 (e.g., a customer computer), a cable modem 28, a CMTS 30, a cable television network 18, 22, 26, and a backbone data network 12 (e.g., the Internet).

However, some cable television networks provide only uni-directional cable systems, supporting only the "downstream" cable data path. A return data path via a telephone network, which may be referred to as a "telephony return", such as a public switched telephone network provided by AT&T, GTE, Sprint, MCI and others, may be used for the "upstream" data path. A cable television system with an upstream connection to a telephony network may be referred to as a "data-over-cable system with telephony return." Such a return system is indicated in FIG. 1 where the cable modem 28 is also shown connected to the public switched telephone network ("PSTN") 48 which is in turn connected to the backbone network 12 as indicated by the dashed line. An exemplary data-over-cable system with telephony return includes customer premises equipment 14, a cable modem 28, a CMTS 30, a cable television network 18, 22, 26, a public switched telephone network 48, a telephony remote access concentrator ("TRAC") 49 and a backbone data network 12. The CMTS 30 and the telephony remote access concentrator 49 together may be referred to as a "telephony return termination system."

The preferred embodiments may be utilized with either a bi-directional cable system or a data-over-cable system with telephony return. Cable modems and cable modem termination systems include those provided by 3Com Corporation of Santa Clara, Calif., Motorola Corporation of Schamburg, Ill., Bay Networks of Santa Clara, Calif., Scientific-Atlanta of Norcross, Ga., and others.

Cable Modem Protocol Stack

Figure 2:
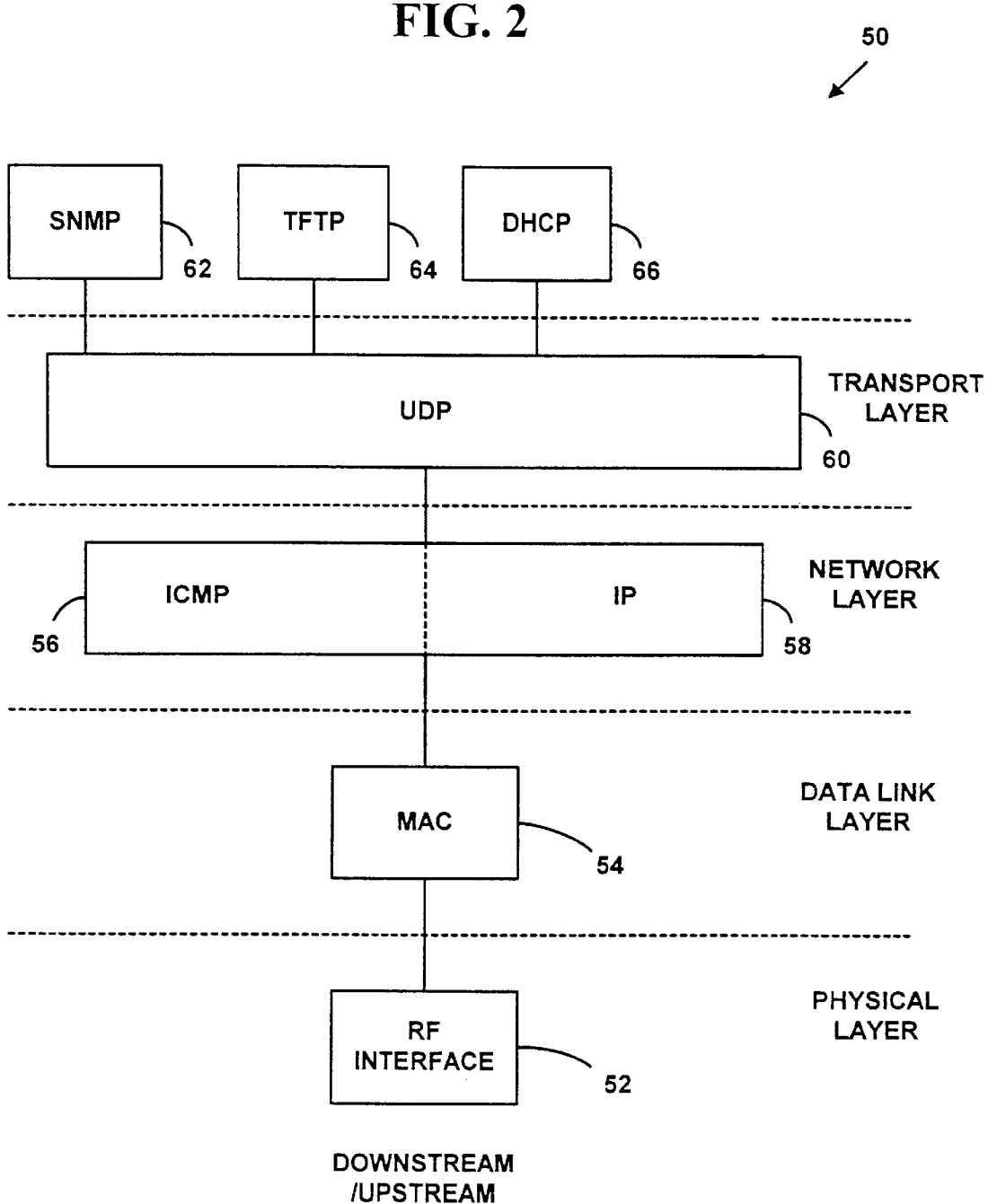
FIG. 2 is a block diagram illustrating a protocol stack for a cable modem in the data-over-cable system depicted in FIG. 1.

FIG. 2 is a block diagram illustrating a protocol stack 50 for the cable modem 28. FIG. 2 illustrates the downstream and upstream protocols used in the cable modem 28. As is known in the art, the Open System Interconnection ("OSI") model may be used to describe computer networks. The OSI model consists of seven layers including, from lowest-to-highest, a physical, data-link, network, transport, session, presentation and application layer. The network layer places routing information into the data packets. The data link layer transmits data packets. The physical layer transmits the data packets and overhead as bits over a communication link.

For data transmission over a bi-directional data-over-cable system, the cable modem 28 connects to the cable network 26 in a physical layer via a radio frequency ("RF") interface 52. In an exemplary preferred embodiment of the present invention, the RF interface 52 has an operation frequency range of approximately 50 Mega-Hertz ("MHz") to 1 Giga-Hertz ("GHz") and a channel bandwidth of 6 MHz on the downstream channels. In another exemplary preferred embodiment of the present invention, which relates to a bi-directional data-over-cable system, the RF interface 52 has an operation frequency range of approximately 5 MHz to 42 MHz on the upstream channels. However, other operation frequencies and bandwidths may also be used and the invention is not limited to these frequencies and bandwidths. The RF interface 52 preferably uses a signal modulation method of Quadrature Amplitude Modulation ("QAM"), although other methods may alternatively be used. As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels.

The RF interface 52 uses QAM-64 or QAM-256 for downstream transmission. The upstream transmission uses QAM-16 or Quadrature Phase-Shift-Keying ("QPSK"). For the upstream embodiment, the symbol rate of upstream transmission may be 160, 320, 640, 1,280, or 2,560 kilo-symbols per second ("ksymsec") for 16-QAM, or 160, 320, 640, 1,280, or 2,560 ksym/sec for QPSK. However, other operating frequencies, modulation methods, and symbol rates may alternatively be used. However, other RF interfaces 52 could also be used and the present invention is not limited to interfaces complying with DOCSIS.

Referring again to FIG. 2, above the RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. However, other MAC layer 54 protocols may alternatively be used and the preferred embodiments are not limited to DOCSIS MAC layer protocols.

Above both the downstream and upstream data-link layers in a network layer 52 is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. Additional information on the IP 58 may be found in the Internet Engineering Task Force ("IETF") standard Request For Comments ("RFC") 791—Internet Protocol, dated September 1981, incorporated herein by reference.

Also within the network layer of the protocol stack 50, an Internet Control Message Protocol ("ICMP") layer 56 is used for network management. The main functions of the ICMP layer 56, hereinafter ICMP 56, include error reporting, reachability testing (e.g., "pinging"), congestion control, route-change-notification, performance, and subnet addressing. Since the IP 58 is an unacknowledged protocol, datagrams may be discarded and the ICMP 56 is used for error reporting. Additional information on the ICMP 56 may be found in IETF standard RFC 792—Internet Control Message Protocol, dated September 1981, incorporated herein by reference.

Above the IP 58 and the ICMP 56 is a transport layer with a User Datagram Protocol ("UDP") layer 60. The UDP layer 60, hereinafter UDP 60, roughly corresponds to OSI layer 4, the transport layer, but is typically not defined as part of the OSI model. As is known in the art, the UDP 60 provides a connectionless mode of communication with datagrams. Additional information on the UDP 60 may be found in IETF standard RFC 768—User Datagram Protocol, dated Aug. 28, 1980, incorporated herein by reference.

Above the network layer are a Simple Network Management Protocol ("SNMP") layer 62, a Trivial File Transfer Protocol ("TFTP") layer 64, and a Dynamic Host Configuration Protocol ("DHCP") layer 66. The SNMP layer 62 is used to support network management functions. Additional information on the SNMP layer 62 may be found in IETF standard RFC 1157—A Simple Network Management Protocol (SNMP), dated May 1990, incorporated herein by reference. The TFTP layer 64 is a file transfer protocol used to download files and configuration information. Additional information on the TFTP layer 64 may be found in IETF standard RFC 1350—The TFTP Protocol (Revision 2), dated July 1992, incorporated herein by reference. The DHCP layer 66 is a protocol for passing configuration information to hosts on an IP 54 network. Additional information on the DHCP layer 66 may be found in IETF standard RFC 2131—Dynamic Host Configuration Protocol, dated March 1997, incorporated herein by reference. More or fewer protocol layers could also be used with a data-over-cable system 16.

Upstream Data Transmission

A cable modem 28 typically transmits on an upstream channel during a transmission mini-slot allocated by the CMTS 30. The upstream channel may be viewed as time-divided into a stream of mini-slots, each of which is a unit of granularity for upstream transmission opportunities. The CMTS 30 also times the mini-slots to prevent collisions between the transmissions from different cable modems by instructing the cable modems 28 to transmit alternately during the mini-slots.

Before transmitting data, however, a cable modem 28 must first request permission to transmit from the CMTS 30.

Figure 3:
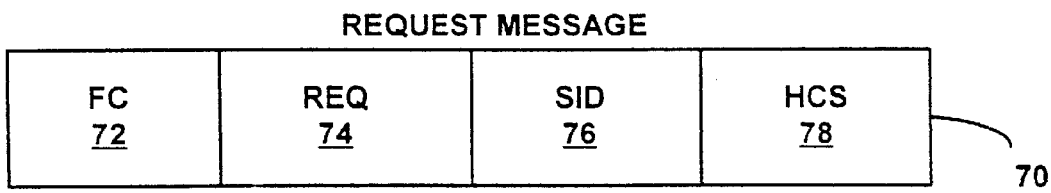
FIG. 3 is a block diagram illustrating a structure of a Request message that may be transmitted by a cable modem in the data-over-cable system of FIG. 1.

A cable modem 28 that wishes to transmit sends a Request MAC 54 message to the CMTS 30. FIG. 3 is a diagram illustrating a preferred structure of a Request message 70. The Request message 70 includes a frame control field 72 ("FC"), a bandwidth request field 74 ("REQ"), a service identifier field 76 ("SID"), and a MAC 54 header check sequence field 78 ("HCS"). Descriptions for the Request message 70 fields are shown in Table 1.

TABLE 1

| Request message 70 Parameter | Description |
| --- | --- |
| FC 72 | Frame control. Identifies type of MAC 54 message. |
| REQ 74 | Total amount of bandwidth |
| SID 76 | Service Identifier for the cable modem 28 that sent the REQ message. |
| HCS 78 | MAC 54 header check sequence. |

The SID 76 is a unique identifier for the cable modem 28 that is requesting permission to transmit. The SID 76 may be assigned by the CMTS 30 when the cable modem 28 initializes and registers with the CMTS 30 as discussed below. The REQ 74 field contains a measure of how much bandwidth, i.e. mini-slots, the cable modem 28 requests for the transmission of its data to the CMTS 30.

Figure 4:
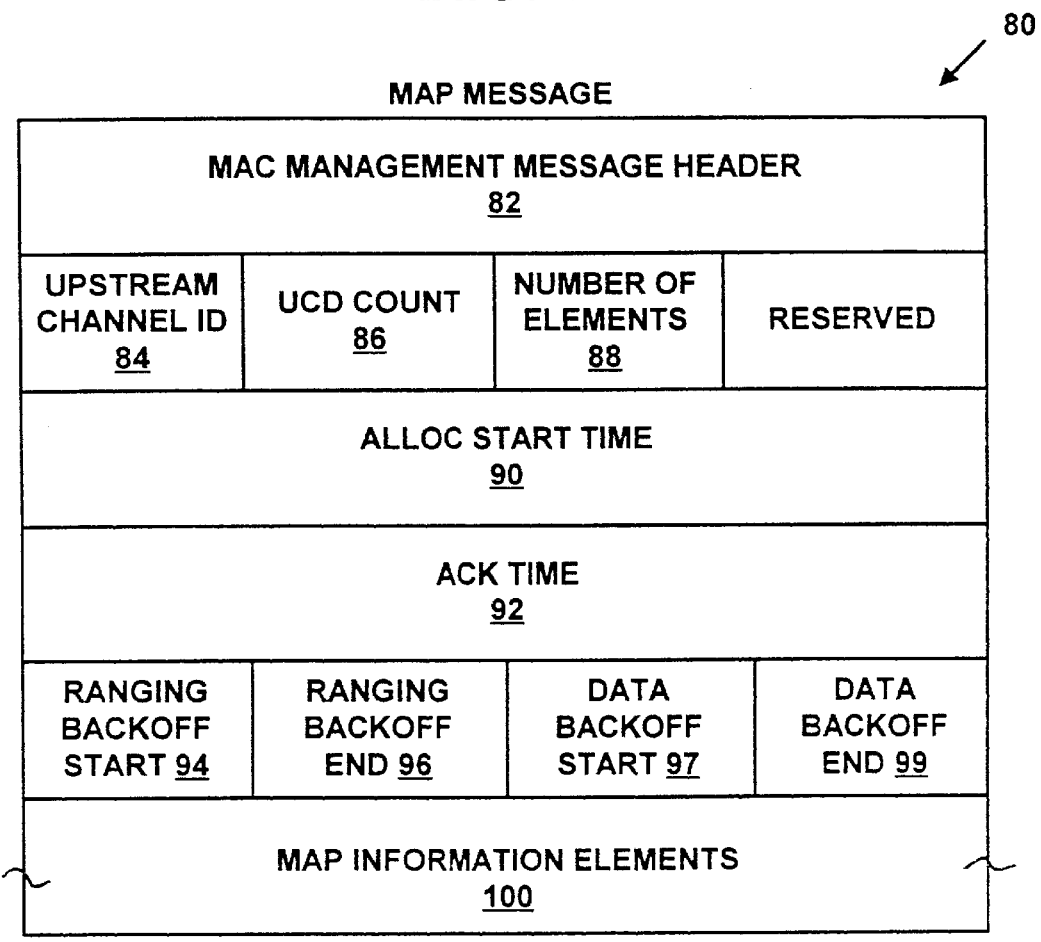
FIG. 4 is a block diagram illustrating the structure of a MAP message transmitted by a CMTS in the data-over-cable system of FIG. 1.

In response, the CMTS 30 builds an Upstream Bandwidth Allocation Map message 80 ("MAP") and transmits it via the downstream channel to all cable modems. Typically, the CMTS 30 receives requests from a number of cable modems that wish to transmit and may allocate one or more transmission mini-slots to each of the cable modems 28. The MAP message 80 then informs each cable modem 28 of its permitted mini-slot(s) for transmission. FIG. 4 is a block diagram illustrating the structure of a preferred MAP message 80. The MAP message 80 includes a MAC 54 management header field 82, an upstream channel identifier field 84, a upstream channel descriptor count field 86 ("UCD Count"), a number of elements field 88, a reserved field, an allocation start time field 90 ("Alloc Start Time"), an acknowledgement time field 92 ("Ack Time"), a ranging backoff start field 94, a ranging backoff end field 96, a data backoff start field 97, a data backoff end field 99, and a MAP information elements field 100. Descriptions for the MAP message 80 fields are shown in Table 2.

TABLE 2

| MAP message 80 Parameter | Description |
| --- | --- |
| MAC 54 Management Message Header 82 | The header of this message identifying it as a MAP message. |
| Upstream Channel ID 84 | The identifier of the upstream channel to which this message belongs. |
| UCD Count 86 | Matched the value of the Configuration Change Count of the UCD which describes the burst parameters which apply to this map. |
| Number of Elements 88 | Number of information elements in the map. |
| Alloc Start Time 90 | Effective start time from CMTS 30 initialization (in mini-slots) for assignments within this map. |
| Ack Time 92 | Latest time, from CMTS 30 initialization, (mini-slots) processed in upstream. |

TABLE 2-continued

| MAP message 80 Parameter | Description |
|---|---|
| Ranging Backoff Start 94 | Initial back-off window for initial ranging contention. |
| Ranging Backoff End 96 | Final back-off window for initial ranging contention. |
| Data Backoff Start | Initial back-off window for contention data and requests. |
| Data Backoff End | Final back-off window for contention data and requests. |
| MAP Information Elements 100 | Encoded data blocks that designate the allocation of transmission mini-slots on the upstream channel. |

The MAP message 80 informs the cable modems 28 of the allocation of mini-slots for a scheduled upstream usage interval and when to begin the usage interval. In a given upstream usage interval, selections of the cable modems 28 alternately transmit on the upstream channel. As is known in the art, each upstream usage interval is composed of transmission intervals, also referred to as "bursts," which comprise at least one mini-slot.

The upstream channel identifier field 84 within the MAP message 80 includes an identifier for the upstream channel to which the MAP message 80 applies. As is known to those skilled in the art, the data-over-cable system 16 may support upstream transmission on more than one upstream channel. For example, a common head-end 18 may serve more than one branch of HFC paths 22–26, and each branch may require a unique upstream channel for reasons of network configuration. In such a case, the Upstream Channel ID 84 may distinguish between the branches. Thus, the MAP message 80 intended for the cable modems 28 served by one branch may be distinguished from the MAP messages 80 for cable modems 28 on other branches by use of the Upstream Channel ID 84.

The MAP Information Elements field 100 designates the order and duration of the transmissions from the cable modems 28 for the upstream channel. As described in DOCSIS, one element may describe each transmission. The Number of Elements field 88 contains the total number of such elements. FIG. 5 is a block diagram illustrating a preferred structure of the MAP Information Elements 100. Each interval includes a field for the SID 76 of the cable modem 28 that is permitted to transmit in each interval. The Interval Usage Code field 102 ("IUC") informs the cable modem 28 what kind of upstream transmission is permitted in the interval. The offset field 104 specifies when the transmission interval occurs. In this manner, the series of intervals permit the selection of cable modems 28 to deliver their data packets to the CMTS 30 without the transmissions colliding on the upstream path.

The IUCs 102 are values, that designate the type of transmission that is permitted in each interval. The cable modems 28 may be capable of several types of transmission. For example, the transmission may be for the purposes of ranging, allowing a cable modem 28 to compensate for delay on the cable network. Additionally, the transmission may be for the purpose of delivering a data packet to the CMTS 30. Two types of data transmissions typically occur: a short data grant or a long data grant. These data grants correspond to IUCs 102 that are described in DOCSIS. For example, a short data grant may be appropriate when the CPE 14 only has a small amount of data to transmit on the upstream channel, such as a few keystrokes or the opening of a hyperlink on a web page. A long data grant may be appropriate when the CPE 14 requests to transfer a file through the backbone network 12. A Request Interval, i.e., a notification of when a modem is allowed to make a request for bandwidth, is another type of IUC. In this manner, the CMTS 30 instructs the cable modem 28 when to transmit, on which upstream channel, and what type: of data to transmit.

It should be understood, however, as alternatives to the foregoing, that other field settings for the Request message 70, the MAP message 80, and the MAP Information Elements 100 might be used.

Parameters for Upstream Data Transmission

Additionally, the cable modem 28 may transmit data packets in adjacent mini-slots according to different transmission formats for the RF interface 52. Associated with the formats are parameters for data transmission. The parameters for upstream data transmission include the symbol rate, the upstream channel frequency, the modulation type, the preamble, and Forward Error Correction ("FEC") parameters as described in Table 3.

TABLE 3

| Parameter for data transmission | Description |
|---|---|
| Frequency | Center frequency of upstream channel (Hz). |
| Symbol rate | Multiples of base rate of 160 ksym/sec. |
| Modulation type | QPSK or 16-QAM. |
| Preamble | Training sequence of bits used for automatic gain control and modulation. |
| FEC level (T) | Amount of redundant bytes that are added to correct for errors. |
| FEC data coverage size (k) | Amount of bytes over which error correction is to be performed. |

As is known in the art, FEC adds redundant bits to the data packet to detect, locate, and correct transmission errors. The FEC level ("T") is a measure of the amount of redundant data that must be added to the data packet to allow for error correction; A higher value of T provides a better level of error correction. The FEC data coverage size ("k") is a measure of the amount of information over which data correction is to be performed; For the same FEC level, an increase in the FEC data coverage size will result in more errors going uncorrected. It should be understood that many more data transmission parameters are possible.

Figure 6:
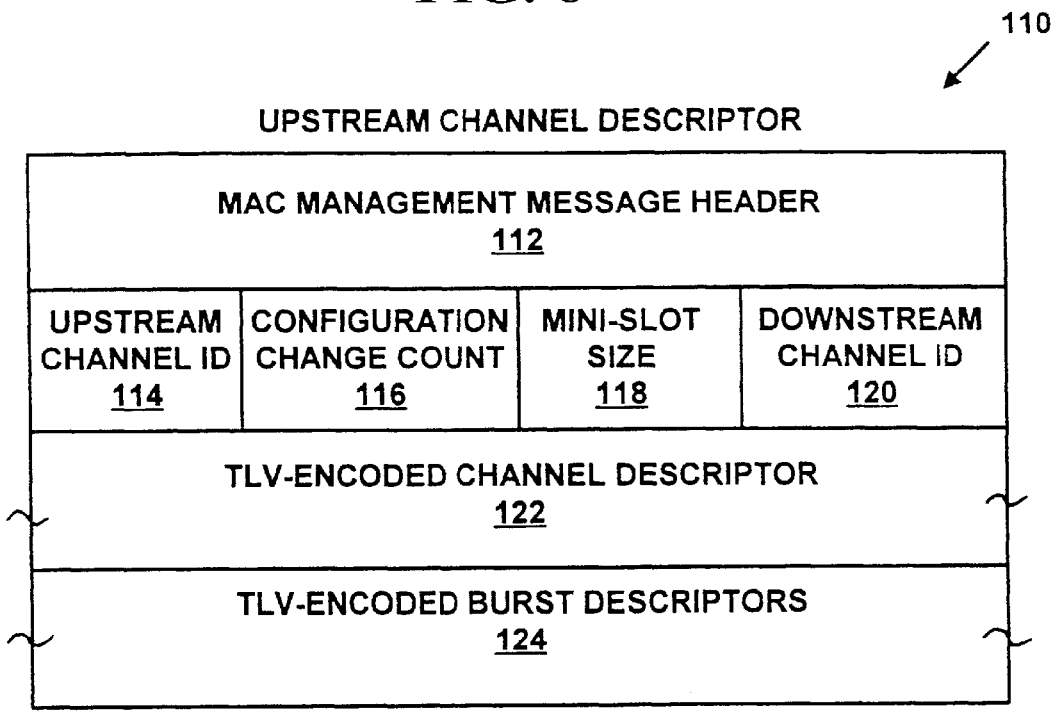
FIG. 6 is a block diagram illustrating the structure of a UCD message transmitted by a CMTS in the data-over-cable system of FIG. 1.

Because each cable modem 28 transmitting on an upstream channel may transmit according to a different transmission format, each cable modem 28 may undergo reconfiguration so that their future transmissions occur according to another format. The CMTS 30 may reconfigure the cable modems 128, for example, by issuing an Upstream Channel Descriptor ("UCD") message. FIG. 6 is a block diagram illustrating a preferred structure of a UCD message. The UCD message 110 includes a MAC 54 Management Message Header field 112, an upstream channel identifier field 114, a configuration change count field 116, a mini-slot size field 118, a downstream channel identifier field 120, a type-length-value ("TLV") encoded channel descriptor field 122, and TLV encoded burst descriptor field 124. Descriptions for the UCD message 110 fields are shown in Table 4.

TABLE 4

| UCD message 110 Parameter | Description |
| --- | --- |
| MAC 54 Management Message Header 112 | The header of this message identifying it as a UCD message. |
| Upstream Channel ID 114 | The identifier of the upstream channel to which this message belongs. |
| Configuration Change Count 116 | CMTS 30 increments by one whenever any descriptors change. |
| Mini-Slot Size 118 | The duration of a mini-slot. |
| Downstream Channel ID 120 | The identifier of the downstream channel on which this message has been transmitted. |
| TLV Encoded Channel Descriptors 122 | Data blocks which describe the parameters for data transmission to be implemented for the overall channel. |
| TLV Encoded Burst Descriptors 124 | Data blocks which describe the parameters for data transmission to be implemented for each burst. |

The upstream channel identifier field 114 typically contains a number that identifies the upstream channel to which the UCD message 110 applies. As with the upstream channel identifier field 84 within a MAP message 80, the upstream channel identifier field 114 may distinguish upstream channels when there are more than one upstream channel.

The CMTS 30 sends the transmission parameters to the cable modems 28 as TLV encoded channel descriptors 122 or as TLV encoded burst descriptors 124. TLV encoding is known to those skilled in the art. A selection of parameters for the overall channel and the bursts are given in Table 3 above. The CMTS 30 encodes these parameters as channel or burst descriptors and incorporates them into a UCD message 110 to reconfigure one or more cable modems 28. In response, a cable modem 28 reads the UCD message 110, determines if there are any changes in the parameters that describe its upstream channel, and determines if there are any changes in the parameters that describe its burst descriptor. The cable modem 28 reconfigures itself to transmit data according to these parameters. However, it should be understood that other field structures and values for the UCD message 110 might be used for the present invention.

When the CMTS 30 changes the data transmission parameters for an upstream channel, it builds a UCD message 110 with channel and/or burst descriptors that correspond to the new parameters. The UCD message 110 is sent on the downstream channel 26 to the cable modems 28. The CMTS 30 also sends out a corresponding MAP message 80. The burst descriptors in the UCD message 110 correspond to the IUC fields 102 of the MAP Information Elements 100 of the MAP message 80. As each cable modem 28 transmits on the upstream channel it may be doing so according to data transmission parameters that are different from other cable modems 28. In this manner, the cable modems 28 within an upstream usage interval may alternately transmit data packets to the CMTS 30 according to independent data transmission parameters.

Cable Modem Initialization and Registration

The CMTS 30 schedules and configures cable modem 28 data transmissions as discussed above. However, when a new cable modem 28 joins the data-over-cable system 16, it must undergo initialization and registration procedures before the system 16 permits it to transmit data. The initialization procedure is described in the DOCSIS specification and typically includes: detecting any Removable Security Module ("RSM"); scanning for a downstream channel and establishing synchronization with the CMTS 30; obtaining upstream transmission parameters from a UCD 110 message; ranging; establishing IP 58 connectivity; establishing the time of day; establishing a Security Association (if the RSM is present); transferring operational parameters; and initializing Baseline Privacy (if the RSM is not present but some privacy is needed).

As part of the initialization procedure, the cable modem 28 searches for a downstream channel. Typically, the cable modem 28 stored its parameters, such as the frequency of the last accessed downstream channel, in non-volatile memory during its last operation. The cable modem 28 tries to reacquire this downstream channel, but if it fails then the cable modem 28 typically scans the downstream frequency band until it finds a downstream signal with which it may synchronize. Once it synchronizes with the downstream channel, the cable modem 28 monitors the channel and obtains a UCD 110 message. The UCD 110 message may contain the data transmission parameters for an upstream channel upon which the cable modem 28 may transmit data to the CMTS 30. Once it has obtained a suitable UCD 110 and configured itself to transmit on the upstream channel as identified in the upstream channel ID field 114, the cable modem 28 enters a ranging phase.

In the ranging phase, the cable modem 28 and CMTS 30 compare timers to detect delays in the propagation of signals from the cable modem 28 to the CMTS 30. One source of the signal delay is due to the finite propagation time for radio-frequency signals in the physical cable medium 26. These delays are typically larger than burst times and may lead to timing errors if left uncompensated. To compensate for the delays in the cable medium 26, the ranging phase discerns a timing offset such that the cable modem's 28 transmissions are aligned to the appropriate mini-slot boundary. Ranging adjusts each cable modem's 28 timing offset such that the cable modem 28 appears to be physically located right at the CMTS 30. To do so, the cable modem 28 transmits its data burst prematurely, by an amount equal to the timing offset to ensure that the signal arrives at the CMTS 30 just when it is expected.

After ranging, as known to those skilled in the art of data-over-cable systems, the cable modem 28 typically obtains an IP 58 address through the Dynamic Host Configuration Protocol 66. The DHCP 66 response message that confirms that the cable modem 28 receives a particular IP 58 address typically includes the name of a configuration file. After the initialization procedure, the cable modem 28 downloads the named configuration file from the CMTS 30 via TFTP 64. The cable modem 28 uses this file to set operational parameters for its communication with the CMTS 30 over the hybrid fiber-cable network 22–26. In particular, the configuration file may contain instructions that direct the cable modem 28 to monitor another downstream channel or to transmit on a different upstream channel.

Figure 7:
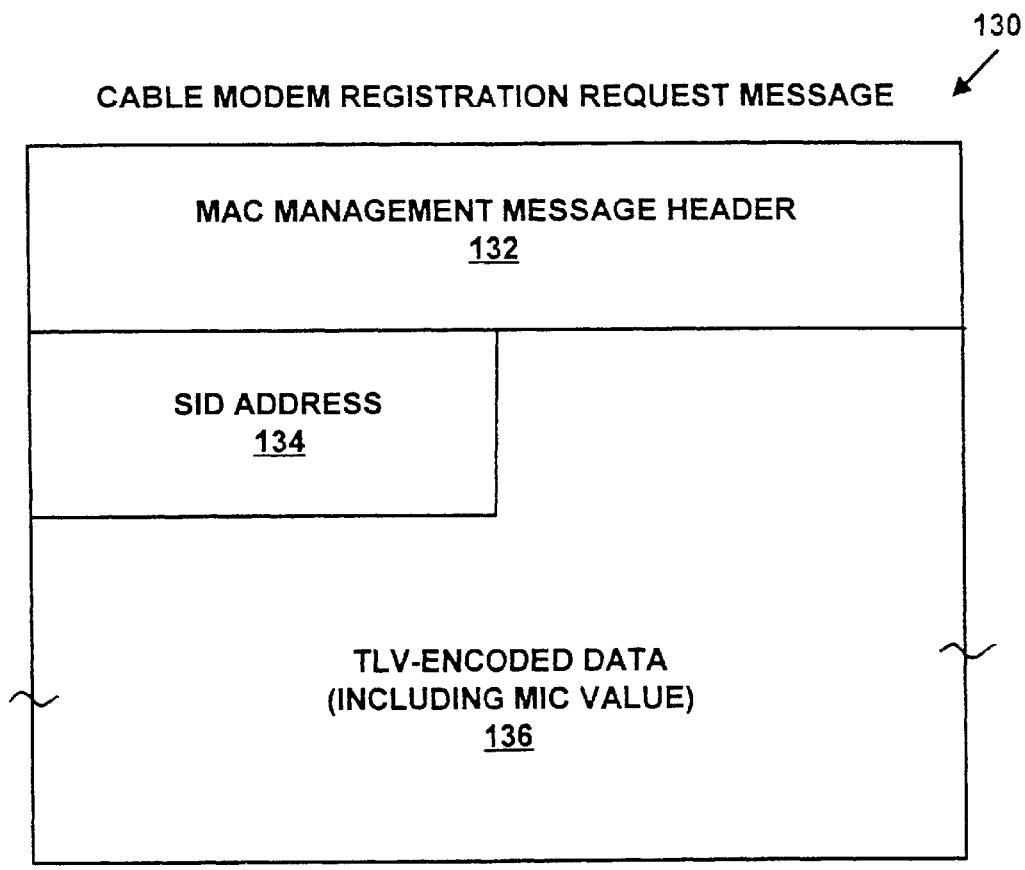
FIG. 7 is a block diagram illustrating the structure of a REG-REQ message that may be transmitted by a cable modem in the data-over-cable system of FIG. 1.

Once the cable modem 28 initializes and receives the configuration file, it registers with the CMTS 30 and prepares to receive data from the data network 12. The cable modem 28 creates a registration request message ("REG-REQ") and transmits it to the CMTS 30. FIG. 7 is a block diagram illustrating a preferred structure of a REG-REQ message that may be transmitted by a cable modem. The cable modem 28 REG-REQ message 130 includes a MAC 54 management message header 132, a SID 76 address field 134, and a TLV encoded data field 136 with configuration parameters including a message integrity check ("MIC")

value. The CMTS 30 responds with a registration response message ("REG-RSP") authorizing the cable modem 28 to transmit data over the data network 12. After completing the initialization procedure and the registration procedure, the cable modem 28 is able to communicate with the data network 12 through the CMTS 30.

MAP-Initiated Channel Change

As noted earlier in this document, when impairments in the upstream channel from the cable modem to CMTS exist, cable modem systems provide for the ability to change the upstream channel in which a given cable modem uses to transmit. However, prior art methods involving the Upstream Channel Change (UCC) message exchange are not deterministic, that is, the time required for the change cannot be known in advance, therefore this method of operation is inadequate for voice applications, such as Voice over Internet Protocol (VoIP) applications, Internet telephony, Internet video on demand, or other time critical services, where service can be lost by such delays or degraded below service quality objectives. In addition, because of the potentially long time associated with the UCC message exchange, dynamic load balancing becomes inefficient.

Figure 8:
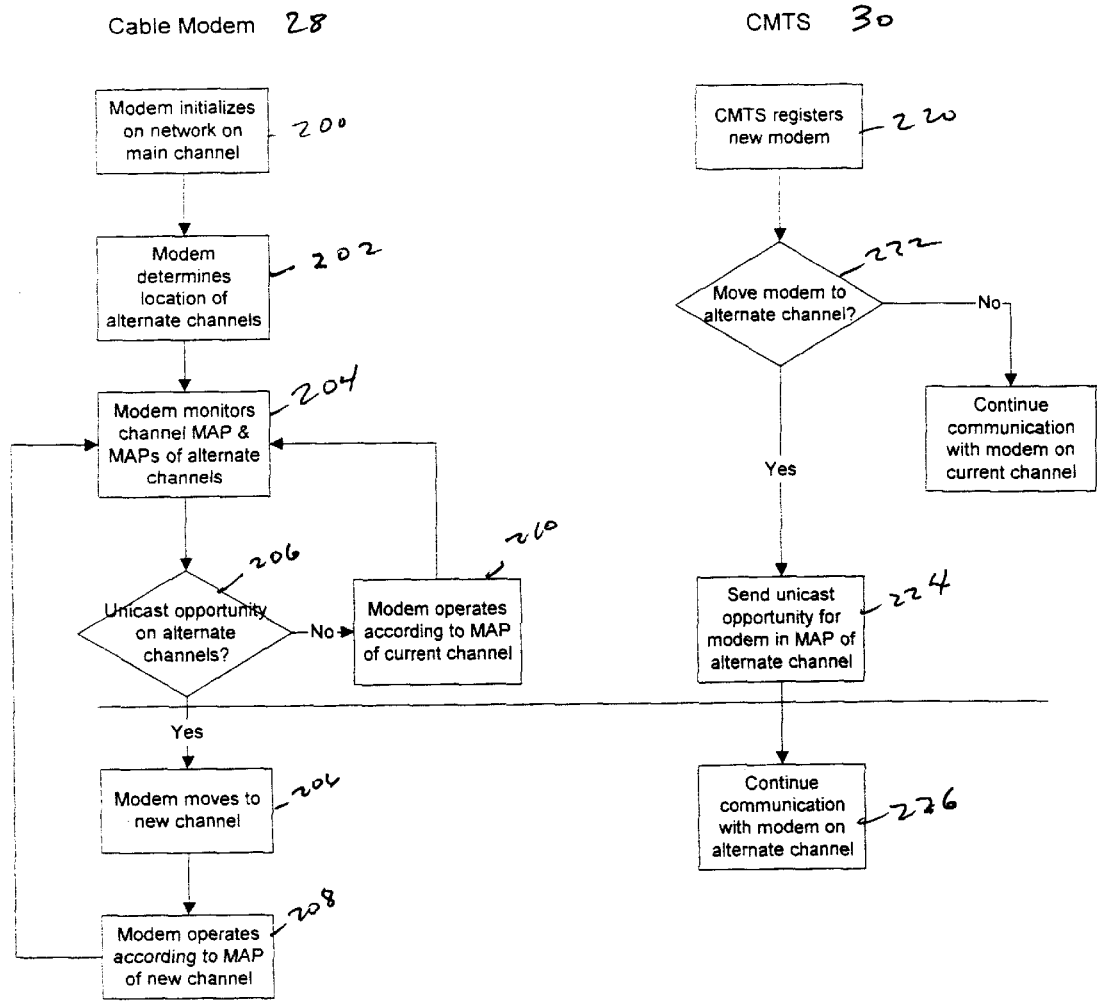
FIG. 8 is a flow chart illustrating a preferred embodiment of the method of the invention.

The present invention provides a new way of initiating a channel change is needed in the art which is more deterministic, which requires much less time to complete than the standard UCC message exchange, and facilitates efficient load balancing. The method is illustrated in FIG. 8 and described below. Basically, the method involves cable modems monitoring MAP messages 80 (FIG. 4) in its channel and in alternate channels from the CMTS and looking for unicast opportunities on the alternate channels. The term "unicast opportunities" means an allocation of bandwidth to a specific cable modem that needs to change its upstream channel.

As shown in FIG. 8, the cable modem initializes itself on the network on a main channel (step 200), and then determines the location of viable alternate channels for upstream transmission (step 202). The modem monitors MAP messages in its current channel and in the viable alternate channels (step 204). When it determines that there is a unicast opportunity on the alternate channel, the modem moves to the new channel (step 206) and operates according to the instructions in the MAP message in the new channel (step 208). If the MAP message received and monitored in step 204 does not contain a unicast opportunity for that cable modem, then it continues to operate according to the MAP message of its current channel, step 210.

From the perspective of the CMTS, it registers the new modem at step 220 in response to the modem initializing itself on the network at step 200. When, for example, noise or other impairment conditions warrant moving a particular modem from one upstream channel to another, as indicated at step 222, the CMTS generates a MAP message for the suitable alternate channel containing a unicast opportunity for that modem and sends the MAP message to the modem, as indicated at step 224. The modem responsively changes channels as indicated at step 206. The CMTS continues to communicate with the cable modem in the new upstream channel as indicated in step 226.

In one embodiment, the method monitors not only its MAP messages 80 (FIG. 4), but also the other MAP messages that are carried on its own downstream channel. The modem would not necessarily need to monitor all the MAP messages on the downstream channel, but only the MAP messages of those channels that would be viable alternate upstream channels. The term "viable alternate upstream channel" is used herein to refer to those upstream channels that are actually potentially available to the cable modem. Due to physical wiring considerations, a given cable modem may be only able to transmit in certain upstream channels.

In particular, the cable modem monitors those MAP messages, and the Upstream Channel Descriptors (UCD) 110 (FIG. 6) associated with the MAP messages and waits for a MAP initiated channel change. In other words, the modem would look for a unicast transmission opportunity on another MAP and use that event as a channel change request. Thus, a CMTS that needed a modem to change from channel A to channel B would simply insert a unicast transmission opportunity for that modem in the MAP associated with channel B. Upon seeing that opportunity, the modem would change from channel A to channel B, and begin transmission with the constraints associated with channel B.

The unicast opportunity could be a station maintenance interval, the continuation of a in-progress service flow, or it could be the establishment of a service flow on the new channel used on a request made in the current channel. Other types of opportunities are of course thin the teachings of the invention.

The SID field 76 in the MAP information elements portion 100 of the MAP message 80 (see FIG. 5) is used to specifically identify the modem that is to make the channel change, thereby making the MAP message modem specific (i.e., "a unicast opportunity"). The new upstream channel is specified in the channel ID field 84 of FIG. 4 and in field 114 of the associated UCD (FIG. 6). The time of when to start transmission is specified by the offset field 105 of FIG. 5.

Upon changing channels, the modem would continue operation on that channel, but would continue to monitor the MAPs of the other viable alternate upstream channels, including its previous channel.

With this method, there is no messaging delay as there is with the exchange of UCC messages. Instead, the modem can begin operation on the new channel as soon as it makes the necessary internal changes required for transmission on the new channel. Examples of such internal changes are tuner and equalization adjustments.

While presently preferred embodiments of the invention have been described with particularly, persons skilled in the art will appreciate that variation from the specifics of the preferred embodiment are possible without departure from the spirit and scope of the invention. This scope of the invention is to be determined by reference to the appended claims, interpreted in view of the foregoing description.

What is claimed is:

1. In a data-over-cable system having a cable modem termination system, a method of changing an upstream channel for a modem in said data over cable system, comprising the steps of:

monitoring upstream bandwidth allocation map (MAP) messages associated with an alternate channel in said data-over-cable system for an indication that said modem may change the channel it is currently transmitting on in the upstream direction to said alternate channel, and in response to said monitoring, said modem moving from the current channel to said alternate channel, whereby the change in upstream channel may be achieved in an efficient manner without substantial delay and wherein said change in said upstream channel is obtained without exchange of upstream channel change request and upstream channel change reply messages between said cable modem termination system and said cable modem, respectively.

2. In a data-over-cable system having a cable modem termination system, a method of changing an upstream channel for a modem in said data over cable system, comprising the steps of:

monitoring upstream bandwidth allocation map (MAP) messages associated with an alternate channel in said data-over-cable system for an indication that said modem may change the channel it is currently transmitting on in the upstream direction to said alternate channel, and in response to said monitoring, said modem moving from the current channel to said alternate channel, whereby the change in upstream channel may be achieved in an efficient manner without substantial delay and wherein said modem monitors MAP messages associated with its current channel and MAP messages associated with other channels in said data-over-cable system that are viable alternate channels to said current channel.

3. In a data-over-cable system having a cable modem termination system, a method of changing an upstream channel for a modem in said data over cable system, comprising the steps of:

monitoring upstream bandwidth allocation map (MAP) messages associated with an alternate channel in said data-over-cable system for an indication that said modem may change the channel it is currently transmitting on in the upstream direction to said alternate channel, and in response to said monitoring, said modem moving from the current channel to said alternate channel, whereby the change in upstream channel may be achieved in an efficient manner without substantial delay and, wherein said indication is found in a MAP message in said alternate channel, and wherein said indication comprises an unicast upstream transmission opportunity for said modem.

4. The method of claim 3, wherein said modem moves from said current channel to said new channel upon receipt of a MAP message in said alternate channel containing said upstream transmission opportunity.

5. The method of claim 3, wherein said unicast upstream transmission opportunity comprises a station maintenance interval.

6. The method of claim 3, wherein said unicast upstream transmission opportunity comprises a portion of an in-progress service flow.

7. The method of claim 3, wherein said unicast upstream transmission opportunity comprises an establishment of a service flow on said new channel based on a request made in said current channel.

8. A cable modem performing the method of any one of claims 1–7.

9. In a data over cable system including a cable modem termination system, the improvement comprising:

said cable modem termination system transmitting upstream bandwidth allocation map (MAP) messages, said MAP messages for monitoring by cable modem s in a data over cable system, said MAP messages containing fields with data instructing said cable modems to change the upstream channel said cable modems use for transmitting data to said cable modem termination system, wherein said upstream channel change is effected by said cable modems monitoring said MAP messages and without requiring an Upstream Channel Change Request message to be sent from said cable modem termination system to said cable modems.

* * * * *